H. C. GUETSCHOFF.
ACCOUNT REGISTER.
APPLICATION FILED MAR. 10, 1909.
953,608.
Patented Mar. 29, 1910.
5 SHEETS—SHEET 5.
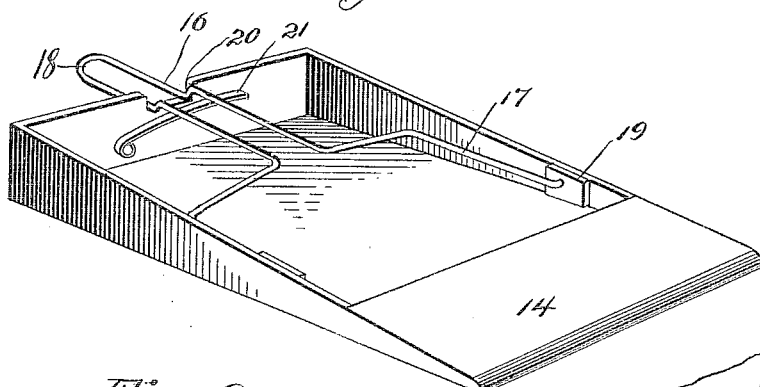
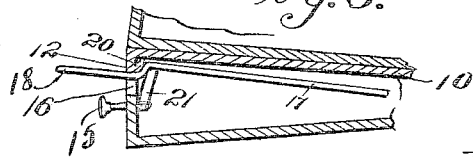
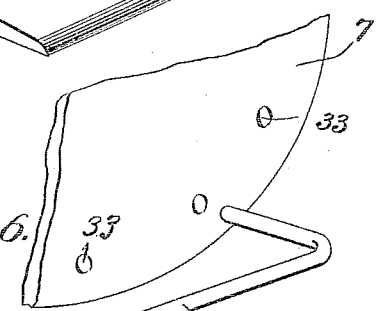
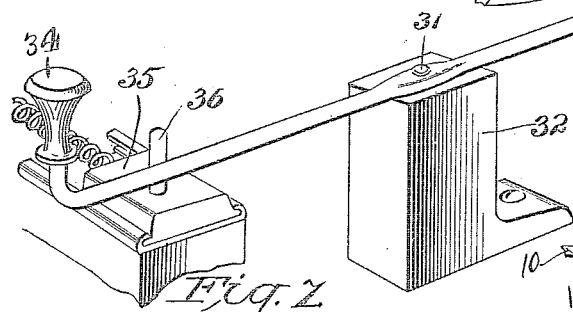
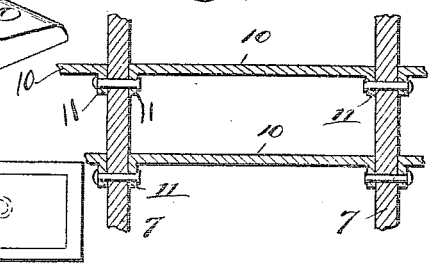
Inventor
Herman C. Guetschoff.
Witnesses
By Victor J. Evans
Attorney

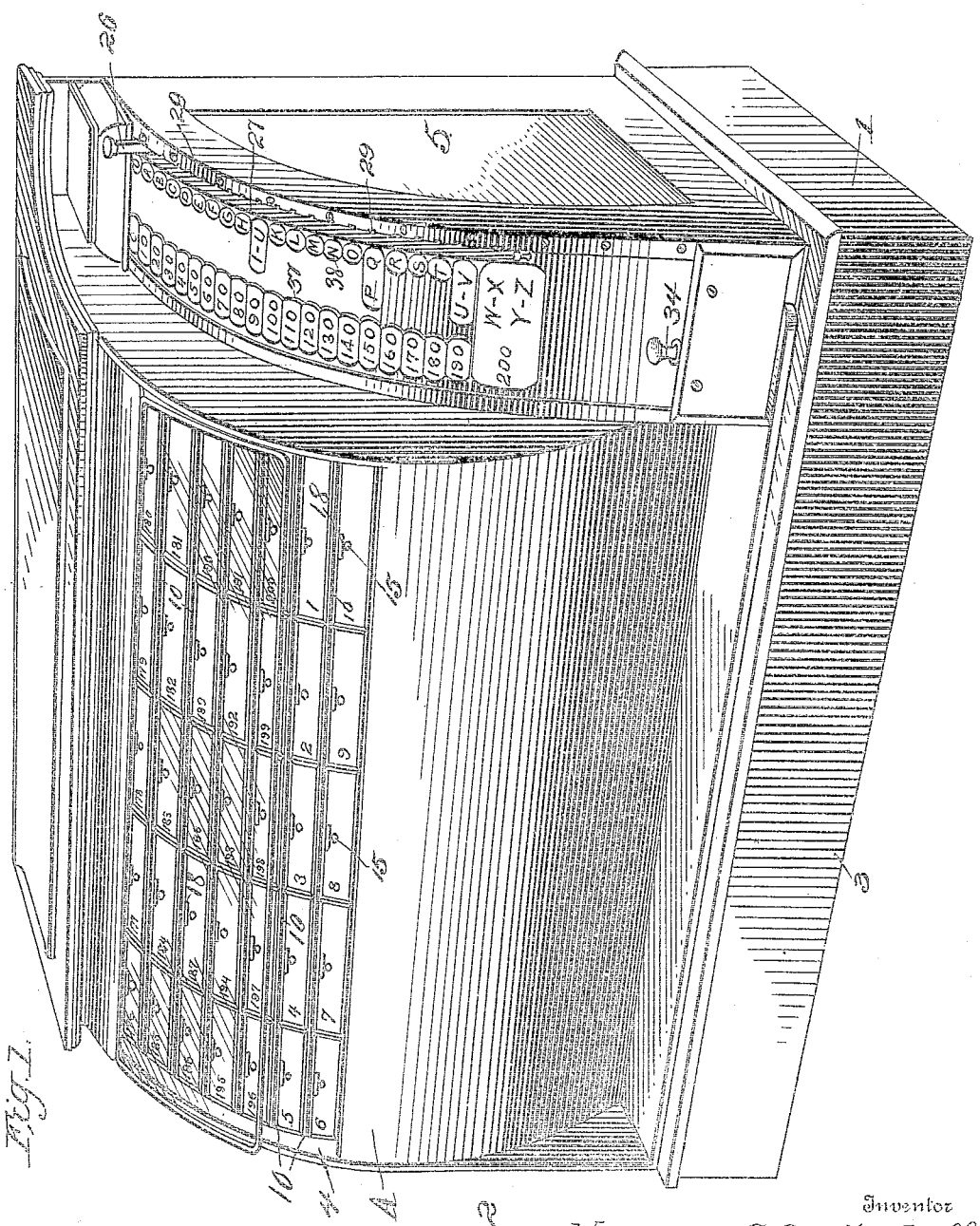

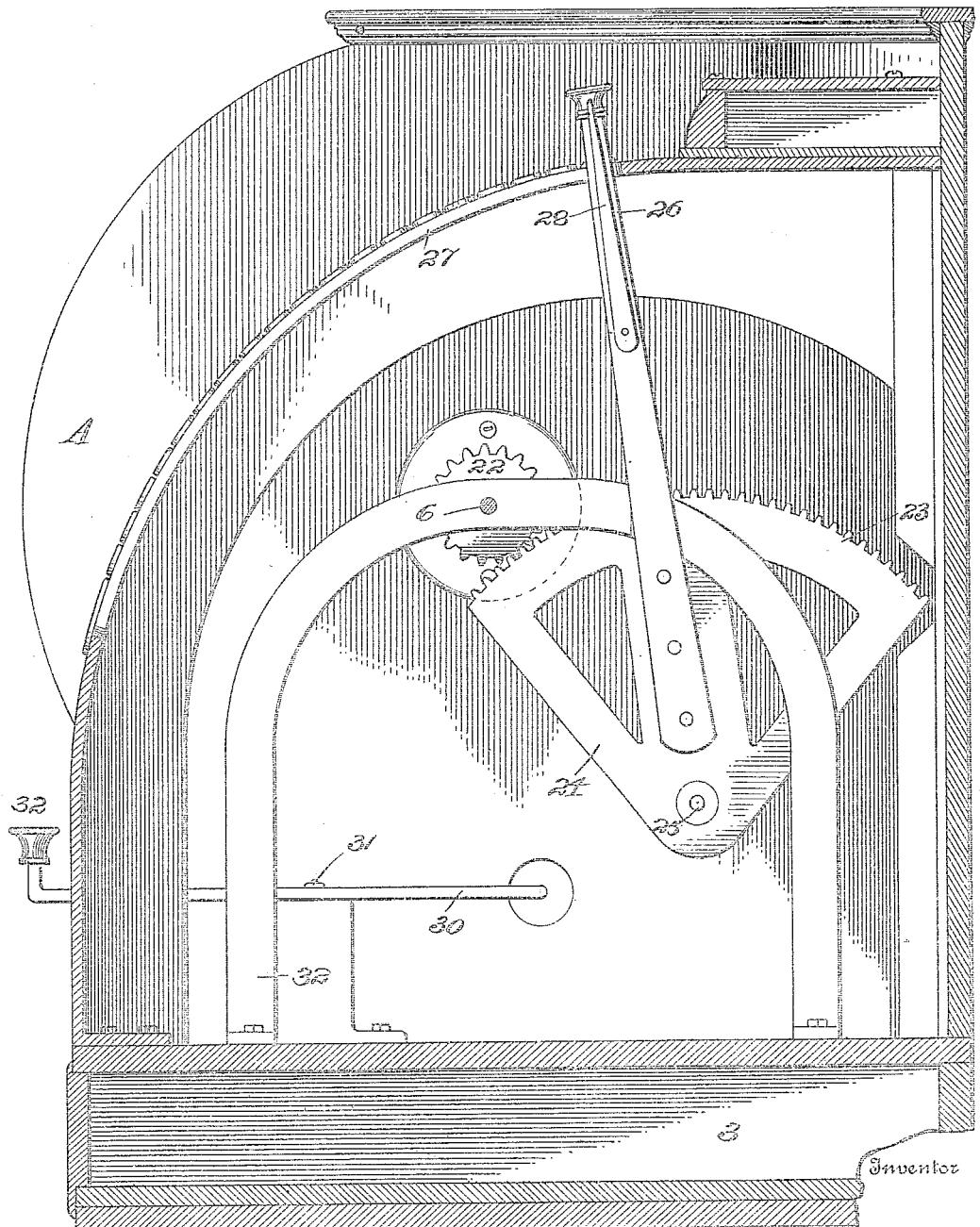

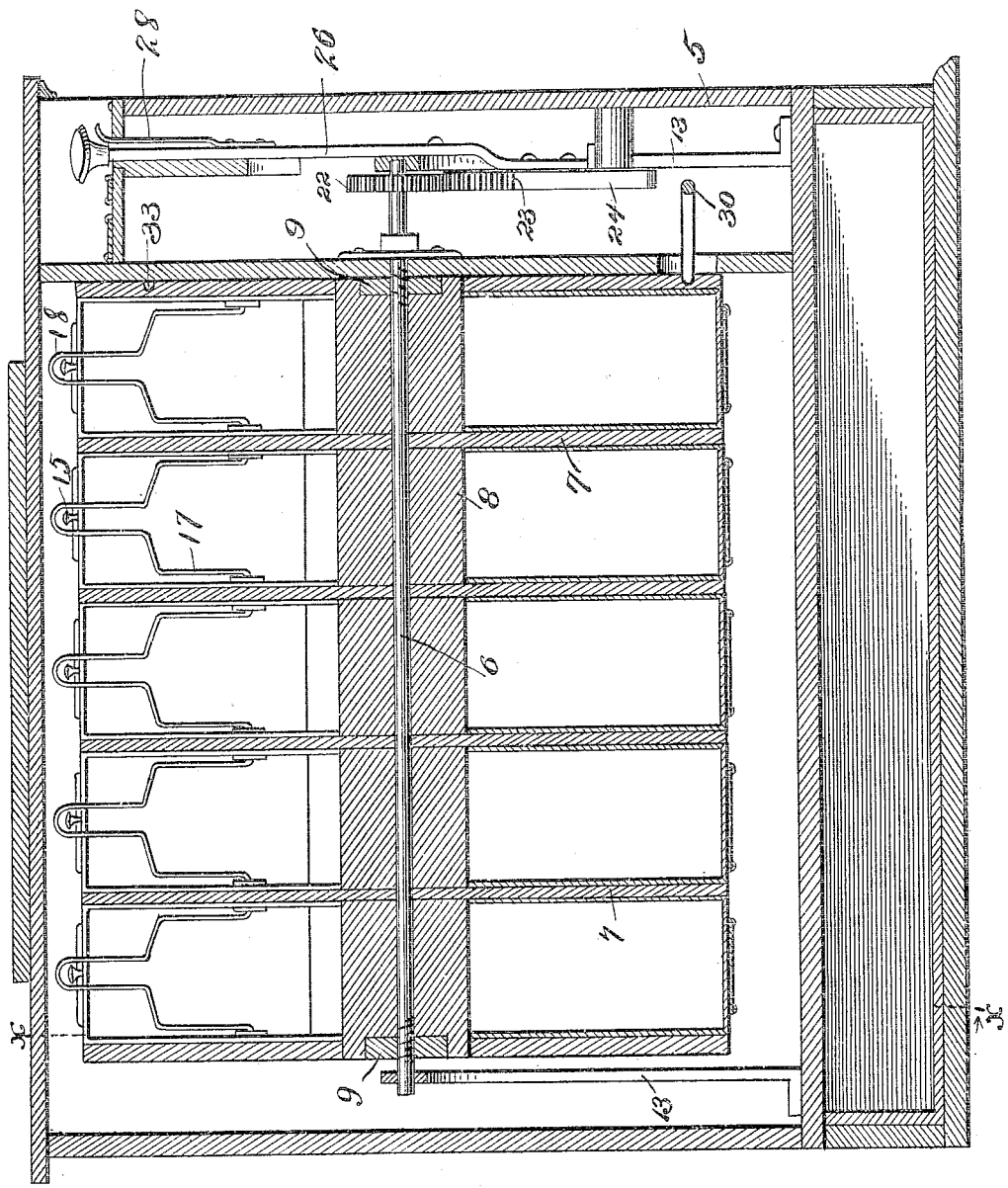

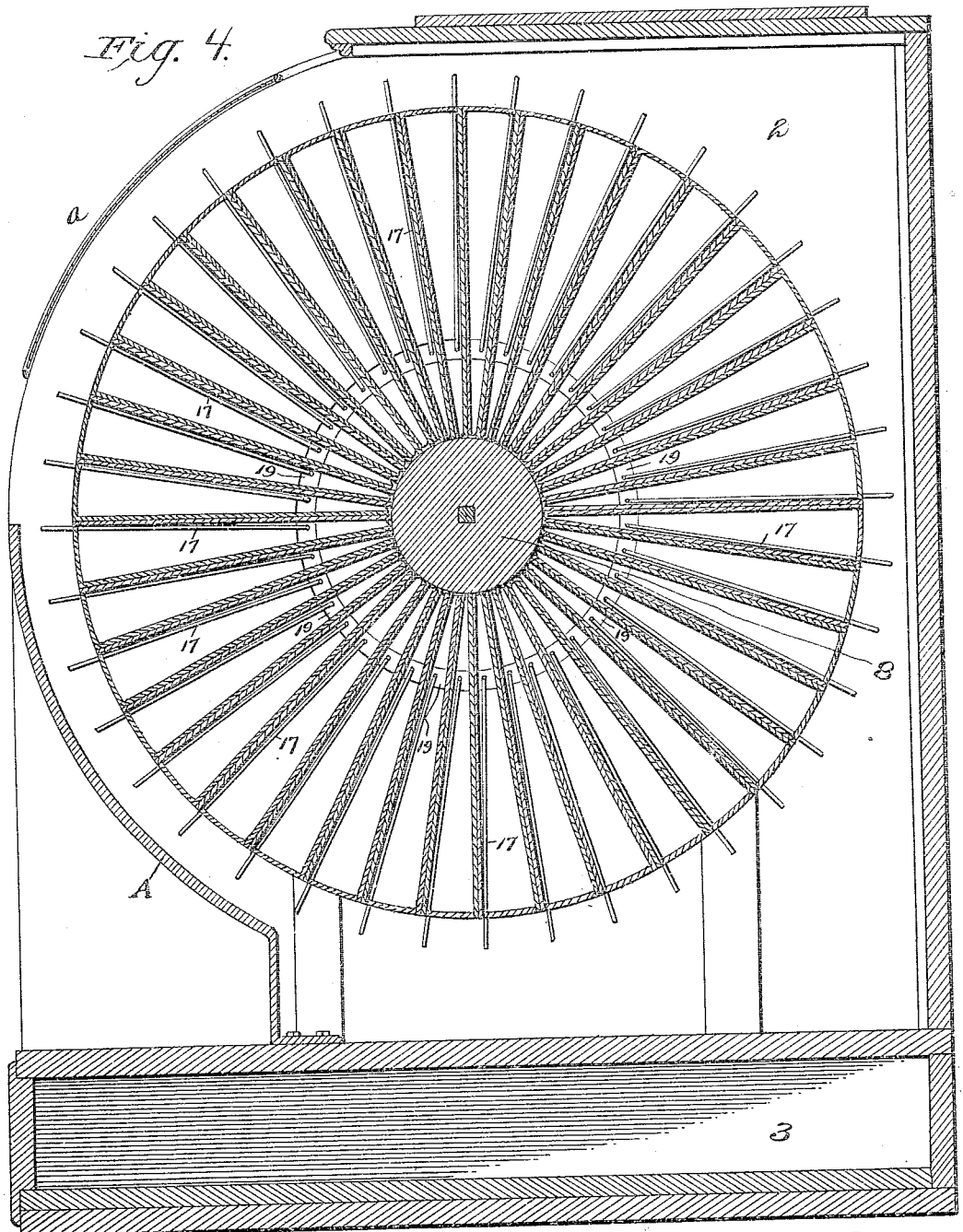

UNITED STATES PATENT OFFICE.

HERMAN C. GUETSCHOFF, OF FRASER, MICHIGAN.

ACCOUNT-REGISTER.

953,608.

Specification of Letters Patent. Patented Mar. 29, 1910.

Application filed March 10, 1909. Serial No. 482,617.

*To all whom it may concern:*

Be it known that I, HERMAN C. GUETSCHOFF, a citizen of the United States, residing at Fraser, in the county of Macomb and State of Michigan, have invented new and useful Improvements in Account-Registers, of which the following is a specification.

This invention has for its object to provide novel means to facilitate the keeping of accounts, being of special advantage to those merchants engaged in a credit business as the accounts may be kept on slips which are filed in an index cabinet and quickly obtained for making entries thereby obviating the necessity of multiplying entries through a series of books, two slips or like devices being all that is required for the transaction, one for the customer and the other for the merchant.

The invention consists of the novel features, details of construction and combination of parts which hereinafter will be more particularly set forth, illustrated in the drawings attached and finally pointed out in the appended claims.

Referring to the drawings forming a part of the specification:—Figure 1 is a perspective view of a rotary account register embodying the invention. Fig. 2 is an end view thereof, the portion of the casing inclosing the operating mechanism being in transverse section. Fig. 3 is a vertical central longitudinal section of the register. Fig. 4 is a transverse section on the line *x—x* of Fig. 3. Fig. 5 is a perspective view of a tray or holder for the accounts or slips. Fig. 6 is a detail view of the means for holding the drum in the adjusted position. Fig. 7 is a front view of the tray or holder. Fig. 8 is a detail section of a portion of the drum, showing more clearly the manner of retaining the trays in place therein. Fig. 9 is a sectional detail of a portion of the drum lengthwise thereof, showing the manner of connecting the radial partitions to the disks.

Corresponding and like parts are referred to in the following description indicated in all the views of the drawings by the same characters of reference.

The device comprises a cabinet, a drum rotatably mounted in the cabinet and provided with a series of compartments, a plurality of trays or holders removably fitted in the compartments and adapted to receive the account slips and index actuating means for the rotary drum.

The cabinet comprises a base 1 and a superstructure 2, the base being hollow and of rectangular form and adapted to receive a drawer 3. The superstructure in transverse section is approximately of quadrangular form, the drum casing A having a portion covered by means of a curved glass front *a* and having an opening 4 to admit of the trays or holders being removed from the drum or placed in position as may be required. A compartment 5 is located at one end of the superstructure to receive the drum actuating means and the index.

The drum comprises a shaft 6, disks 7 slipped upon the shaft and constituting partitions, and spacers 8, the latter being mounted upon the shaft 6 and coming between adjacent disks or partitions 7 to properly space the same. The disks 7 are clamped between the spacers 8 which latter consist of circular blocks or sleeves. End portions of the shaft 6 are made rounding and threaded to receive nuts 9 between which the spacers 8 and disks 7 are clamped. The shaft 6 is preferably of square form intermediate its rounded ends and the openings in the disks 7 and spacers 8 are of corresponding shape, so that the disks and spacers rotate with the shaft. The annular spaces between the partitions or disks 7 are subdivided by radial partitions 10 which consist preferably of sheet metal plates having their longitudinal edge portions bent approximately at a right angle as indicated at 11 and placed against the sides of the disks or partitions 7 to which they are secured by rivets or like fastening means. The partitions 10 aline longitudinally, their flanged edges 11 being suitably secured to the disks 7, as clearly shown in Fig. 9. The outer edges of the partitions 10 are bent and folded upon themselves to provide reinforced flanges 12, which, besides stiffening the outer edges of the partitions provide stops to retain the trays or holders in the several compartments when in position.

The drum is rotatably mounted within the casing and is adapted to be turned so as to bring any portion thereof opposite the opening 4 to permit certain trays or holders to be removed or placed in position. It is to be understood that the drum may be provided with a number of compartments depending upon the particular use for which the register is constructed and to the number of partitions 7 and 10 employed. End portions of the shaft 6 extend beyond the drum to form trunnions or journals which obtain bearings in standards 13 provided at opposite ends of the case.

The trays or holders are all of like formation and are shown most clearly in Fig. 5 as in outline approximating the form of the compartments of the drum provided to receive them. As indicated most clearly in Fig. 5, the tray is shallow and tapers longitudinally, the inner tapered end being closed as indicated at 14 preferably to receive the inner ends of the account slips so as to prevent displacement thereof. A finger piece 15 projects from the front end of the tray and a notch 16 is formed in the upper edge of the front above the finger piece 15. A clamp 17 is pivotally connected to opposite sides of the tray and is formed of spring wire of suitable gage bent into an approximately U-form and having the closed end narrow as indicated at 18 to form a handle which is adapted to enter the notch 16 and project from the front of the tray a short distance to be engaged by the thumb or finger of the hand when it is required to release the tray from the drum preliminary to withdrawing the tray to gain access to the account slips or other tickets or devices held thereby. The extremities of the side members of the clamp 17 are bent outwardly and enter openings formed in the reinforced portions 19 at the sides of the tray. By having the clamp pivotally connected to the tray it may be thrown upward and backward out of the way when it is required either to place account slips in the tray or remove said slips from the tray. A stop 20 is provided upon the handle portion 18 of the clamp near its outer end to engage with the flange or like portion 12 of a compartment of the drum so as to retain the tray when inserted therein. The stop 20 may be provided in any manner but it is preferred to bend or crimp the side members forming the handle 18, as indicated. A spring 21 is secured at one end to the inner side of the front of the tray and is adapted to exert an upward pressure upon the handle portion of the clamp 17 thereby holding the stop 20 in engagement with the flange 12. The notch 16 is of a depth to admit of the stop 20 clearing the flange 12 when the projecting end of the handle 18 is depressed.

A pinion 22 is fast to an end portion of the shaft 6 and meshes with the teeth 23 of a quadrant 24 pivotally mounted at 25. A movement of the quadrant 24 through one-fourth the arc of a circle effects a complete revolution of the drum, this being brought about by the relative sizes of the toothed portions of the pinion 22 and quadrant 24.

A lever 26 is attached at its inner end to the quadrant 24 and projects through a slot 27 in the curved front of the compartment 5. A spring 28 is secured at its inner end to a side of the lever 26 projects through the slot 27 and is adapted to enter any one of a series of notches 29 formed at one side of the slot 27 so as to hold the lever 26 and coöperating parts in the relative adjusted position. The drum when moved to any desired position is made secure by means of a detent 30 consisting of a lever pivotally mounted at 31 upon a post or other support 32. One end of the detent 30 is bent and is adapted to enter any one of a series of depressions or openings 33 formed in the end disk 7 of the drum adjacent the wall separating the compartment 5 from the part 2. The outer end of the detent lever 30 projects through a slot formed in the front of the compartment 5 and terminates in a button or finger piece 34. A spring actuated slide 35 is mounted below the front portion of the detent lever 30 and a pin 36 projects upward therefrom and engages the forward portion of the detent lever to hold its inner bent end in engagement with the depression or opening 33 in which fitted. The lateral movement of the projecting end of the lever 30 effects disengagement of the inner bent end of the lever 30 from the drum, thereby permitting the latter to be rotated to bring any one of the trays or holders in position opposite the opening 4.

The index or selecting means for properly positioning the drum are placed upon the curved front of the compartment 5 at one side of the slot 27 and consist, as indicated, of numbers 37 and letters 38. However, it is to be understood that any suitable indices may be provided, the same being printed or otherwise provided. The trays or holders may be both numbered and lettered or may be numbered and provided with the name of the party whose account slip, book or like tallying device may be placed therein. It is to be understood that the names may be arranged in groups and the groups disposed in alphabetical rotation according to the accustomed way of indexing accounts or other matter for ready reference. The letters of the alphabet as also the numbers constituting the indexing means 38 and 37 correspond to the groups of trays or holders and when the projecting end of the lever 26 is moved to the position opposite any letter or collective number, the group of trays or holders of the filing drum are brought to a position opposite the opening 4 thereby admitting of any required tray or holder to be readily obtained. To remove the tray from its compartment within the drum, the projecting end of the handle 18 and the finger piece 15 are grasped between the thumb and finger and the pressure exerted upon the handle 18 releases the stop 20 thereof from the flange 12 thereby admitting of the tray being easily withdrawn. When the tray is replaced in the compartment, the handle portion 18 of the clamp rides under the flange 12 and after the stop 20 clears said flange, the handle 18 is pressed upward by means of the spring 21 thereby causing the stop 20 to engage the rear of the flange 12 and prevent outward displacement of the tray.

Having thus described the invention, what is claimed as new, is:—

1. In a cabinet comprising filing compartments, each having a front downwardly projecting portion, trays insertible within said compartments and clamps mounted in the trays, each clamp having its inner end connected with the tray and having its outer end formed with a projecting handle portion and a stop, the latter being adapted to engage the projecting portion of the compartment to retain the tray when placed in said compartment.

2. In a cabinet comprising filing compartments each having a front downwardly projecting portion, trays insertible within said compartments, and clamps mounted in the trays, each clamp having pivotal connection at its inner end with opposite portions of the tray and having its front portion formed with a projecting handle and a stop, the latter being adapted to engage the projecting portion of the compartment to retain the tray when placed within said compartment.

3. In a cabinet comprising filing compartments, each having a front downwardly projecting portion, trays insertible within said compartments, clamps mounted in the trays each clamp being of approximately U-form and having the inner ends of its side members pivotally connected to the tray and having the outer portion contracted to form a projecting handle portion and a stop, the latter being adapted to engage the projecting portion of the compartment to retain the tray when placed within said compartment, and a spring connected to the tray and exerting an upward pressure upon the clamp to hold the stop thereof in engagement with the downwardly projecting portion of the compartment to retain the tray in place.

4. In combination with a filing cabinet having a compartment provided with a front downward projection, a tray having the upper edge of its front notched and provided with a finger piece below said notch, a clamp of approximately U-form pivotally connected to the sides of the tray and having its front portion contracted to form a handle, which extends through the notch in the front of the tray, and provided with a stop to coöperate with the downward projection of the compartment, and a spring exerting a pressure upon the clamp to hold the stop thereof in contact with said projection.

5. A filing cabinet comprising a shaft, a series of disks slipped upon the shaft and a series of spacers mounted upon the shaft between the disks, means for securing the disks and spacers upon said shaft, partitions sub-dividing the spaces between adjacent disks and connected thereto forming compartments, and trays adapted to be fitted within said compartments.

6. A filing cabinet comprising a shaft a series of disks slipped upon the shaft, a series of spacers mounted upon the shaft between the disks, means for securing the disks and spacers upon the shaft, radial partitions sub-dividing the spaces between adjacent disks into compartments and having their longitudinal edge portions flattened and secured to said disks, and having their front ends bent downward forming projections, trays insertible into the compartments, and spring-actuated clamps mounted in the trays, each clamp having a projecting handle portion and a stop, the latter being adapted to engage the projecting portion at the outer end of the partition forming the compartment in which the tray may be placed to hold said tray when placed in said compartment.

7. In combination, a cabinet, a rotary drum mounted within the cabinet and having a series of openings or depressions in an end, means for turning the drum to a given position, a detent lever having its inner end bent to enter any one of the openings in the end of the drum and having its outer end extended within convenient reach, a spring actuated slide, and a pin projecting from said slide and adapted to engage the lever to normally transmit pressure thereto for holding its inner end in engagement with the drum.

In testimony whereof I affix my signature in presence of two witnesses.

HERMAN C. GUETSCHOFF.

Witnesses:
  LEONARD SCHNEIDER,
  MAUDE I. DONALDSON.